United States Patent Office 3,012,387
Patented Dec. 12, 1961

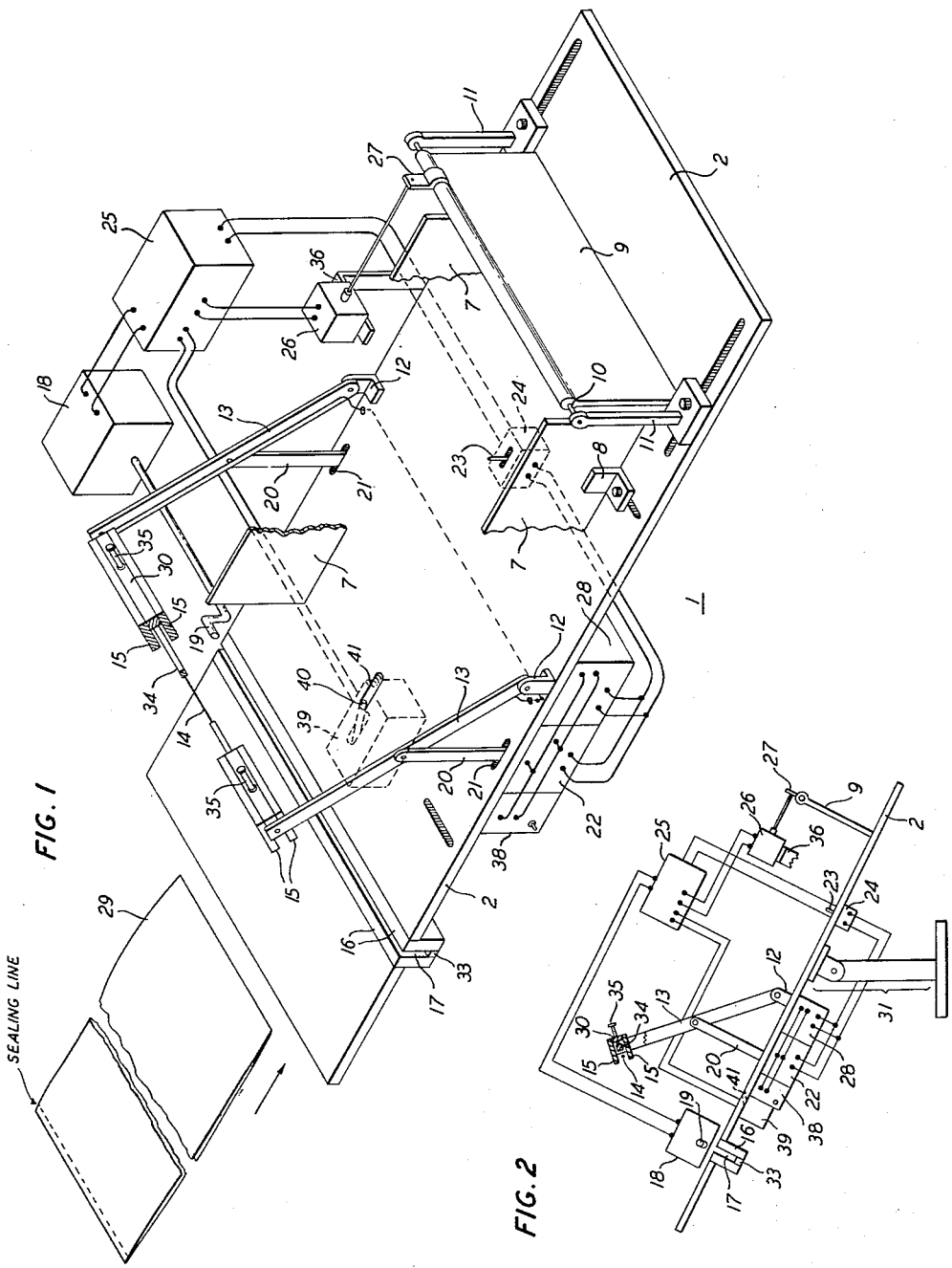

3,012,387
AUTOMATIC BONDING MACHINE
Gerald Jacobs, New London, Conn., and Manuel L. Ruderman, Jamaica, N.Y.; said Jacobs assignor to Seal-A-Bag Automatic Company, New London, Conn., a partnership, and said Ruderman assignor to Errick International Corporation, New York, N.Y., a corporation of New York
Filed Dec. 1, 1959, Ser. No. 856,479
12 Claims. (Cl. 53—76)

This invention pertains to automatic machinery for bonding thermoplastic materials and more specifically to automatic machinery for sealing the closure of and trimming the excess from the plastic bags used in merchandise packaging.

Packaging material of thermoplastic, including bags thereof, are readily obtainable on the market for the packaging of products for sale, storage, or other purposes. These bags may be constructed of various thermoplastic materials such as Pliofilm, Koroseal, Vinylite, heat-sealing cellophane, and the like which are especially desirable for packaging since they are fluid-tight, clean, attractive, show off the product well, may carry attractive advertising on their surfaces, and are easily handled in processing. For example, bags of thermoplastic material may be bonded or sealed simply by the application of heat and pressure on the two sheets thereof to be sealed together.

Various equipment is at present utilized to accomplish the final sealing or bonding closure of these thermoplastic bags after they have been filled with their various products. Certain attributes are especially desirable in such equipment, all of which attributes are provided by none of the prior art machines.

The machinery for bonding should be capable of handling a plurality of different packaged products of varying sizes and shapes. It should require a minimum of operator supervision. It should be capable of bonding bags which are constructed of different thermoplastic materials having different characteristics. It should be capable of handling bags of varying thicknesses, lengths, and widths interchangeably. The machinery should provide means for trimming the excess and waste from the end of the sealed packages and disposing of that waste. The machinery should be capable of operation at a rate adequate to maintain pace with associated packaging machinery. Especially desirable is the ability of such equipment to use a plurality of types of sealing elements. Additional desirable features of sealing machinery are those by which it accomplishes its functions at a minimum expense; for example, a small expenditure of power in operation, the ability to fit into an automatic operation, ease of operation, simplicity and inexpensiveness in construction, and a small size encompassing but a small amount of expensive floor space in a manufacturing facility, allowing operation thereof next to associated machinery by the operator of that associated machinery.

Many of these attributes are found in the manually operated machinery of the prior art. However, this prior art machinery does not include some of the most important of the aforementioned attributes. For example, non-automatic prior art machinery takes all the time and skill of an operator to accomplish the plurality of required manual operations. Certain of these manually operated prior art machines for accomplishing the final sealing of plastic bags after the filling thereof with merchandise are of a type wherein an operator must manually insert the end of a bag to be sealed into the machine, manually operate equipment to hold and seal the bag, manually release the holding and sealing equipment to release the bag, manually remove the sealed bag from the machine, and manually insert it into a container. These prior art bonding or sealing machines may or may not be capable of trimming the waste from the sealed bag. If trimming is possible, however, another manual operation may be required by the operator to remove the waste from the machine.

Not only is an individual operator required for the operation of each of these prior art manual sealing machines because of the plurality of operations required, but, additionally, the number of distinct operations so extends the processing time of an individual bag as to greatly increase the cost thereof.

It is therefore obvious that automatic machinery for accomplishing the sealing and trimming of plastic packaging materials, which will reduce the amount of time, the number of operations, and the number of personnel required for the operation thereof, is especially desirable.

Automatic machinery of various types has been suggested. It is desirable however that machinery for automatically sealing and trimming plastic bags be capable of a higher level of flexibility than that heretofore possible with prior art automatic machinery. For instance, some prior art machines are adaptable to packaging but a single product, others operate with packages of but a single size, thickness, and type of material, and all are too expensive, both initially and operationally. Further, though an operator of most of the manual machinery is capable of making many adjustments in the sealing operation to compensate for the various sizes of bags, for the variance in thickness of the plastic to be sealed, the different types of materials being packaged, the length of the period required for sealing by the different materials, and various other factors which are well known to those skilled in the art, none of the prior art automatic machinery is capable of quickly or efficiently making all of the compensating changes available to the manual operator.

It is necessary that any automatic machinery should be flexible, adaptable, and adjustable enough so that it may accomplish the foregoing variances from the standard operation automatically or with a minimum amount of supervision. It is also desirable that such an automatic machine be capable of utilization in an automatic operation where it may be fed from "bag-filling" machinery automatically and the sealed product removed from the sealer automatically, as by a conveyor belt, without the necessity of any manual operations.

Another desirable feature of bag sealing machinery neglected in prior art automatic machinery is the ability to adapt quickly to unexpected and out-of-the-ordinary situations. For example, in a manually operated machine material out of the expected range of sizes normally encountered may be processed by an operator who manually adjusts the machinery to accomplish the sealing and trimming of such an odd-sized bag and who varies the sealing process to compensate for the limitations of the machinery. Prior art automatically-operated machinery has been incapable of adjusting to such odd-size operation efficiently as no means for by-passing the automatic operation to allow for operator compensation has been provided.

In view of the foregoing, it is an object of this invention to provide improved machinery for bonding thermoplastic packaging materials.

Another object of our invention is to provide automatic machinery for sealing and trimming thermoplastic bags which have been filled with merchandise.

It is another object of our invention to render the bonding operation for closing plastic bags entirely automatic in inserting, sealing, trimming, packing, disposing of waste material, adjusting to different thicknesses of plastic material, and removing the finished product from the sealing machinery.

A further object of our invention is to provide a bonding machine for sealing and trimming thermoplastic material which is especially adaptable to varying types, sizes, and thicknesses of materials.

Another object of this invention is to provide automatic sealing machinery which may be used for sealing plastic bags containing varying kinds of merchandise of different sizes and shapes.

It is a further object of this invention to reduce the expense of sealing and trimming thermoplastic bags by reducing the cost and size of the machinery accomplishing that purpose and speeding the operation thereof.

Another object of this invention is to conserve both power and manpower in the automatic packaging of merchandise in thermoplastic material thereby to reduce the overall expense of the operation.

An additional object of this invention is to render automatic bonding machinery more flexible by providing for by-passing the automatic operation.

Basically our invention accomplishes the foregoing and other objects by making use of an inclined container into which a plastic bag is filled with merchandise placed for sealing by gravity feed. The containe ris square in shape and adjustable in depth, length, and width to handle varying sizes of packaging materials and types of packaged products. As a bag slides down the inner surface of the container it contacts a switch to initiate the automatic operation of the sealing machinery. The bag slides into position against the lower end of the box-like container, and a pivotedly-mounted sealing jaw, the operation of which is initiated by the switch, is lowered upon the upper edges which are to be sealed. The jaw presses against the lower surface of the container, holding the bag firmly and lowering a sealing element in contact therewith. In the illustrated embodiment, to be specifically described hereinafter, the sealing element comprises a thin wire which may be heated in any of a number of well-known ways, lowers to seal the upper edges of the bag, and proceeds therethrough into a channel in the base of the container to trim the upper edges of the bag.

After a predetermined delay, timing equipment raises the sealing element and jaws to release the upper portion of the bag, operates a gate at the lower end of the container to open and allow the bag to slide through, propelled by gravitational force for deposit in a container positioned thereunder, and actuates a source of air directed across the channel of the lower surface of the container to dispose automatically of the waste material left in the container.

Means are provided for disabling the automatic operation so that the machinery may be operated manually to facilitate its flexible use with all sizes and shapes of packages and packaging materials. The gate at the lower end of the container advantageously provides a surface whereon loose materials in the bag to be sealed are automatically more tightly packed by the abrupt striking thereof.

The jaws utilized to hold the upper end of the bag during the sealing operation, are advantageously such as to automatically adjust to varying thicknesses of thermoplastic material so that different bags may be processed by the same machine interchangeably without adjustment to the sealing machine. Additionally, most of the operations of the machine, except for lowering the sealing element and the jaws, heating the heating element, opening the gate to allow removal of the sealed bag, and the timing of the various steps, are accomplished by gravitational force thereby reducing the amount of power consumed in the operation. The machinery disclosed herein may utilize various types of sealing elements in addition to the wire element mentioned previously. Further, the operation is rapid in comparison with other automatic packaging machinery; and the machinery itself is small in size, so that it may fit into a small space near an operator who is controlling another operation for dual use thereby, or into an automatic assembly line without requiring a large amount of space.

Other objects, advantages, and features of our invention may be better understood upon consideration of the following detailed description and the accompanying drawing in which:

FIG. 1 is a perspective illustration disclosing the basic operational elements of our invention; and FIG. 2 is a side illustration of the machine of our invention disclosing less than all of the elements, thereof, useful in understanding the operation of the machine.

Referring now to FIG. 1, there is shown a perspective illustration of an embodiment of our invention for automatically sealing bags of thermoplastic material used in packaging merchandise. The machine consists of a container 1, which may advantageously be of aluminum or other material, having a box-like shape and comprising a bottom plate 2. The plate 2 may be rectangular in shape and of dimensions larger than the largest package to be processed therein. A side piece 7 is mounted by an adjustable mounting 8 on each side of the plate 2 at right angles thereto. Though each side piece 7, shown in cutaway form, may be moved by adjustable mounting 8 to provide for processing wider packaging materials, no adjustment is necessary for sealing bags of smaller widths than set by the piece 7.

Adjustably mounted perpendicular to the base plate 2 toward the end thereof is an end piece or gate 9, mounted in a manner to provide one end of the box-like container 1. The end piece 9 is rotatably secured to a bar 10 at an upper portion thereof to the container 1. The bar 10 pivots in mountings 11 which may be directly and adjustably connected to the base plate 2 or to any other fixed portion of the container 1 for allowing pivoting of the gate 9 thereabout. The mountings 11 are adapted to allow the gate 9 to be positioned at various points along the plate 2 to process material of varying lengths.

Mounted by two pivot mountings 12 to opposite sides of the base plate 2 are two arms 13. Supported between and electrically insulated therefrom at the upper end thereof is a heat-sealing element 14. Securely mounted by the arms 13 above the element 14 is a crosspiece 34 projecting from which are parallel rods 35. Slidably mounted on the rods 35 is a spacing and joining member 30 which supports and separates a pair of upper jaws 15. The jaws 15 may be rectangular metallic bars, secured to the member 30 in a well-known manner, having lower surfaces such as to clamp against the base plate 2 at a pair of lower jaws 16 when the arms 13 are pivoted. The lower jaws 16 may also comprise rectangular metal bars separated by an adjusting member 33, the width of which determines an opening 17 through which passes the heating element 14 for sealing and trimming the thermoplastic material. The jaws 15 and 16 are removable to facilitate interchangeability of heating elements and may, in an alternate form, include the members 30 and 33, the interchangeability of jaws providing for any adjustment.

Positioned adjacent the container 1 is a source of compressed air 18 having a nozzle 19 directed across the lower jaws 16 for providing a stream of cooling air to remove waste matter therefrom after the trimming process.

The arms 13 are pivotably connected to a pair of rods 20 which connect through openings 21 in the base plate 2 to automatic raising and lowering machinery 22, positioned under the base plate 2. Positioned in the middle of the base plate 2 is an arm 23, projecting therethrough and connected to a switch 24 thereunder. The switch 24 is electrically connected to the automatic raising and lowering machinery 22 for operating that machinery 22 to lower and raise the rods 20 for pivoting the arms 13 about the mountings 12. The switch 24 is also connected to a supply circuit 28 which furnishes power for energizing the element 14 and to a timing device 25 which is connected to the source of compressed air 18 for operating that source 18 after a predetermined delay to furnish a cold blast of air across the lower jaws 16 after the raising of the arms 13 and the heat-sealing element 14 attached thereto. The timing device 25 is also connected to a gate-actuating means 26, for instance a magnetic solenoid switch, which may be mounted securely above the container 1, as by the strap 36. The timing device 25 operates the gate-actuating means 26 after a predetermined interval to apply force upon an arm 27, attached to the upper end of the gate 9, for pivoting that gate 9 about the rod 10 to open the gate 9 so that sealed material may be ejected.

Referring now to FIG. 2, there is shown a side view of our invention which will be referred to hereinafter to better illustrate the operation thereof.

The base plate 2 may be seen to be mounted at an angle from the horizontal by incline mounting means 31 which may comprise any of a number of well-known means for manually mounting and pivoting the container 1. When a bag 29 is inserted at the upper end of the base plate 2, gravity causes that bag 29 to slide across the surface of the base plate 2 to the lower end thereof until it comes to an abrupt stop in contact with the gate 9. The surface of the base plate 2 is advantageously of a material such as to facilitate the sliding of the bag 29 thereacross. Should the material in the bag 29 be of a type which must be tightly packed, the impact against the gate 9 will facilitate that packing. The bag 29 may be inserted at the upper end of the container 1 by dropping from automatic filling machinery, not shown, the exit end of which may be positioned above the entrance end of our machine, or by being placed in our machine by an operator who operates a bag-filling machine, not shown, positioned adjacent thereto. As the bag 29 slides down the low friction surface of the base plate 2, it comes in contact with the arms 23 of the switch 24 and operates that switch 24. The operation of the switch 24 initiates energization of the automatic raising and lowering machinery 22, of the supply circuit 28, and of the timer 25.

The machinery 22, upon energization, begins to draw the rods 20 down through the base plate 2 to lower the arms 13 which are pivoted at the mountings 12. The source of energizing current 28 provides current for heating the element 14 connected at the upper end of the arms 13 as soon as the arms 13 begin to lower. The element 14 heats to a predetermined temperature sufficient to provide sealing of the bag 29 when brought in contact therewith. The arms 13 are lowered in such a way that the heating element 14 comes in contact with the upper end of the bag 29 over the adjustable opening 17 after the bag 29 is positioned with its lower end against the gate 9. The upper jaws 15 are mounted to the arms 13, by the crosspiece 34 which supports the two rods 35 thereon. Connecting the two jaws 15 together is member 30 which has holes therein of a diameter slightly larger than the diameter of the rods 35, so that the rods 35 fit therethrough and the jaws 15 move slideably thereon. As the jaws 15 are lowered into contact with the thermoplastic material lying on the lower jaws 16, they exert a force due to their weight to clamp and hold the top of the bag 29 tightly against the lower jaws 16 during the sealing operation. As the arms 13 lower beyond the point at which the upper jaws 15 come in contact with the material on the lower jaws 16, the joining member 30 slides on the rods 35 and allows the arms 13 and the heating element 14 to continue through the thermoplastic material, heating it while under pressure to seal that material. The element 14 then continues through the plane of the base plate 2 entering the opening 17 and advantageously cutting the upper waste portion from the bag 29.

By adjustment of the automatic raising and lowering machinery 22 the heating element 14 may be adjusted to remain in contact with the thermoplastic material of the bag 29 and the jaws 15 to remain positioned to hold that bag 29 for the period of time necessary to allow sealing and then cooling of varying types of thermoplastic material. Further, it is to be carefully noted that, as the upper jaws 15 are slideably mounted to the arms 13 by rods 35, those jaws 15 automatically adjust to hold any reasonable thickness of thermoplastic material securely against the lower jaws 16 during the sealing operation. If it is desired to use material or to incline the container 1 at an angle such that the weight of the upper jaws 15 is insufficient to hold the bag 29 securely, a spring, not shown, may be positioned in an obvious manner to exert pressure between an upper end of the rod 35 and the crossmember 30 for forcing the upper jaw 15 tightly against the material on the lower jaw 16 during the sealing operation.

After the bag 29 has been sealed and trimmed, the machinery 22 raises the rods 20 thereby pivoting the arms 13 upward to remove the upper jaws 15 and the heating element 14 from contact with the bag 29. As the jaws 15 are removed from contact with the thermoplastic material, the timer 25 automatically actuates the gate-operating mechanism 26 to open the gate 9 by applying force on the arm 27 to pivot the gate 9 about the rod 10. Since the surface of the base plate 2, as described supra, is advantageously adapted to allow the bag 29 to slide easily thereacross, the bag 29 slides out of the container 1 through the gate 9 and drops into a container or other receptacle, not shown, positioned thereunder. Additionally, the timer 25, upon the removal of the jaws 15 and the ejection of the bag 29, actuates the source of compressed air 18 to supply a cold blast of air from the tube 19 directed across the lower jaws 16 and the opening 17 therebetween. This cold blast of air advantageously cools the newly formed end seal of the bag 29 and blows away the waste material which lies in the container 1. An opening, not shown, may be provided in the one of the side pieces 7 opposite the tube 19 through which the waste matter may be ejected into some sort of receptacle, not shown, for easy disposal thereof. Alternatively, the source 18 may comprise means for providing a vacuum across the lower jaws 16 to draw waste material into the tube 19 for automatic disposal.

As the bag 29 slides out of the gate 9, the lever arm 23 connected to the switch 24 is released, turning off the source 23, and operating the timing mechanism to turn off the blast of air supplied by the source 18 and cause the gate-actuating mechanism 26 to close the gate 9 so that the machine is ready for the next bag to be sealed.

As may be seen from the foregoing description, our invention is one which automatically inserts, positions, seals, trims, and removes the package 29 from the machinery. In addition, our invention is such that a bag 29 inserted therein which requires packing of the material automatically accomplishes such packing in its sliding to an abrupt stop against the gate 9. As set out supra, our machine adapts to all thicknesses to be sealed automatically, is adaptable to a plurality of widths, lengths and thicknesses of materials, and is adequate for packaging all types of merchandise. The time of the sealing operation may be advantageously adjusted to provide the different sealing periods which may be required for the varying types of thermoplastic materials used in packaging by adjustment of the automatic raising and lowering machinery 22. An additional advantage of the machine resides in the ability thereof to operate with different types of heat sealing elements. For example, our machine may accommodate a bar sealing element, which is capable of either sealing bags or of laminating thermoplastic to various other sheet materials, rather than the wire element 14 disclosed herein. In such a case the materials may be sealed or laminated without trimming, or, alternately, a knife may be positioned at the upper end of the arms 13 in an obvious manner for trimming the waste portion. The opening 17 is then positioned to accept the knife rather than the wire 14.

As shown in FIGS. 1 and 2, the machine may additionally include a material ejecting device 39, positioned under the base plate 2, having an arm 40 projecting at a slight angle to the plate 2 through an opening 41 therein. The device 39 may comprise a solenoid or other well-known means and may be operated by the delay 25 after the gate 9 has opened to apply force by the arm 40 on a bag 29 which is larger or heavier than normal to hasten the ejection thereof through the gate 9. The arm 40 normally resides below the surface of the plate 2 until operation of the device 39 so it does not impede the flow of material. Other well-known devices than the device 39 may alternatively be utilized in place thereof for hastening the ejection of material.

In addition, to facilitate the use thereof, we provide means for operating our automatic bonding machine manually to process packaging materials so large as to be incapable of moving between the side plates 7 even when these plates 7 are moved to the extreme outer positions. A by-passing switch 38 is electrically connected to both the automatic raising and lowering means 22 and the source of energy 28 for operating the arms 13 to lower and the element 14 to seal material placed between the jaws 15 and 16 without the material contacting the switch 24. The jaws 15 and 16 are advantageously wider to accomplish this purpose than the extreme distance separating the side pieces 7 so that the upper end only of a bag may be inserted therebetween and sealed.

Certain of the elements of the machine, such as the automatic raising and lowering means 22, the source of energy 28, the timer 25, the source of compressed air 18, and other elements, comprise operating assemblies which are so well known in the art that the description thereof is not believed necessary; and they have therefore been disclosed in block diagram form. As an example, a plurality of obvious means are available for lowering and raising the rods 20, such as motor and gearing means, reversing motors and lever arms, and other means.

In addition, our machine in one physical embodiment thereof occupies only approximately 6 square feet of floor space; and, therefore, may be positioned near to an operator operating a bag-filling machine or in an automatic assembly line already constituted without requiring appreciable repositioning thereof. The size and ease of operation is such that one unskilled operator may operate both a bag-filling machine and our sealing machine in a single operation in the time normally required to operate only the filling machine.

It is to be noted that only energizing the heating element 14, lowering and raising the arms 13, opening the gate 9, and supplying the blast of air require external power. Most of the conveying, holding, and other steps are accomplished by gravity so that the operation of the machine is especially inexpensive when compared to prior art automatic machinery using conveyor belts which require power at all times for moving the bags through the sealing machinery. Further, some machinery using conveying equipment will not handle packages of varying sizes, but is strictly limited to whatever single size of package the machine is constructed to handle.

It is to be understood that the above-described arrangements are illustrative of the applications and the principles of this invention. Numerous other arrangements may be devised by those skilled in the art without departing from the spirit and scope of the invention.

What is claimed is:

1. A machine for automatically sealing thermoplastic bags comprising a base plate inclined from the horizontal having an upper face thereon; sealing means including a lower and an upper portion, said lower portion being mounted on said upper face of said plate, and said upper portion including a heating element and a holding jaw movably mounted therewith above said lower portion; positioning means mounted on said upper face of said plate including obstructing means at the lower end thereof for obstructing the movement of the bags down said upper face to position the part of a thermoplastic bag to be sealed across said lower portion of said sealing means; activating means for energizing said sealing means and for bringing said upper portion thereof in contact with said lower portion; delay means for removing said obstructing means from the lower end of said plate after a predetermined period; switching means operative in response to the movement of materials down said upper face of said plate for operating said activating means and said delay means; and wherein said activating means includes means for electrically heating said heating element, means pivotably mounted to said plate and mounting said heating element and said holding jaw, and means for moving said last-mentioned means to bring said element and said jaw in contact with said lower portion of said sealing means; and including by-passing means for operating said activating means without the operation of said switching means.

2. A machine as in claim 1 wherein said holding jaw is slidably mounted to said means pivotably mounted to said plate.

3. A machine for automatically sealing thermoplastic bags comprising a base plate inclined from the horizontal having an upper face thereon; sealing means including a lower and an upper portion, said lower portion being mounted on said upper face of said plate, and said upper portion being movably mounted thereabove; positioning means mounted on said upper face of said plate including obstructing means at the lower end thereof for obstructing the movement of the bags down said upper face to position the part of a thermoplastic bag to be sealed across said lower portion of said sealing means; activating means for energizing said sealing means and for bringing said upper portion thereof in contact with said lower portion; delay means for removing said obstructing means from the lower end of said plate after a predetermined period; switching means operative in response to the movement of materials down said upper face of said plate for operating said activating means and said delay means; and wherein said obstructing means includes a second plate mounted perpendicular to said upper face of said base plate in contact therewith at the lower end thereof.

4. A machine as in claim 3 wherein said delay means includes means rotatably mounting said second plate perpendicular to said base plate, and means for exerting a force on said second plate to rotate said second plate from contact with said base plate.

5. An automatic bag sealing machine comprising a base plate; means for mounting said base plate at an incline; a gate; gate supporting means mounted on said plate at one end thereof rotatably supporting said gate substantially perpendicular to the plane of said plate; first and second parallel side member mounted substantially perpendicular to the plane of said plate on opposite sides thereof and perpendicular to the plane of said gate; a first and a second arm pivotably mounted to said plate on a common center line parallel to the plane of said gate; a heating element insulated from and supported at the upper ends of said arms; means for heating said heating element; an upper jaw supported at the upper end of said arms; a lower jaw mounted in said base plate flush with the upper surface thereof and parallel to said gate in a position such as to be in contact with said upper jaw when said arms are pivoted; means for pivoting said arms; supply means for furnishing and directing air under pressure across said lower jaw; gate opening means for applying force to rotate said gate; timing means for operating said supply means and said gate opening means after a predetermined period; and switching means mounted to said plate for operation by material moving thereacross to energize said means for heating said heating element, said means for pivoting said arms, and said delay means, whereby thermoplastic material placed at an upper end of said plate slides down said plate to rest at said gate operating said switch to lower said upper jaws to hold, seal, and time the material, and said switch operating said delay means to control said gate to open to eject the material and said source to furnish air under pressure to dispose of waste material from said lower jaws.

6. An automatic machine as in claim 5 wherein said upper and said lower jaws are removable.

7. An automatic machine as in claim 5 wherein said heating element comprises a wire supported between said arms and connected to said heating means, and said heating means comprises electrical means for producing a current in said wire.

8. An automatic machine as in claim 7 wherein said upper and said lower jaws each comprise two rectangular metallic bars separated by a spacing bar, the surfaces of said rectangular bars being adapted to meet when said arms are pivoted, and wherein said wire is supported between said rectangular bars of said upper jaw.

9. An automatic machine as in claim 5 wherein said gate supporting means and said first and second side members are adjustably mounted to said base plate.

10. An automatic machine as in claim 5 wherein said switching means comprises a switch mounted between said lower jaw and said gate to the bottom of said base plate, said switch having an activating arm protruding through said base plate.

11. An automatic machine as in claim 5 wherein said gate operating means comprises a magnetic solenoid switch and a level arm attached to said switch and mounted on said gate.

12. An automatic machine as in claim 5 wherein said means for pivoting said arms comprises a first and a second rod pivotably attached to said first and second arms, respectively, and projecting through said base plate; and means mounted for raising and lowering said rods.

References Cited in the file of this patent

UNITED STATES PATENTS

| | | |
|---|---|---|
| 2,615,200 | Cloud | Oct. 28, 1952 |
| 2,679,280 | Marsh | May 25, 1954 |
| 2,726,706 | Hakomaki | Dec. 13, 1955 |
| 2,732,988 | Feinstein | Jan. 31, 1956 |
| 2,749,686 | Lorenz et al. | June 12, 1956 |
| 2,808,690 | Mahaffy et al. | Oct. 8, 1957 |
| 2,821,055 | Platt et al. | Jan. 28, 1958 |
| 2,958,170 | Mayer | Nov. 1, 1960 |

UNITED STATES PATENT OFFICE
CERTIFICATE OF CORRECTION

Patent No. 3,012,387                      December 12, 1961

Gerald Jacobs et al.

It is hereby certified that error appears in the above numbered patent requiring correction and that the said Letters Patent should read as corrected below.

In the grant, lines 5 and 16, and in the heading to the printed specification, lines 6 and 7, for "Errick International Corporation, each occurrence, read -- Errich International Corporation --.

Signed and sealed this 22nd day of May 1962.

(SEAL)
Attest:

ERNEST W. SWIDER
Attesting Officer

DAVID L. LADD
Commissioner of Patents